(12) United States Patent
Yamada et al.

(10) Patent No.: US 12,108,801 B2
(45) Date of Patent: Oct. 8, 2024

(54) EXTERNAL UNIT FOR INHALATION COMPONENT GENERATION DEVICE, INHALATION COMPONENT GENERATION SYSTEM, METHOD FOR CONTROLLING EXTERNAL UNIT FOR INHALATION COMPONENT GENERATION DEVICE, AND NON-TRANSITORY COMPUTER READABLE MEDIUM

(71) Applicant: JAPAN TOBACCO INC., Tokyo (JP)

(72) Inventors: Manabu Yamada, Tokyo (JP); Manabu Takeuchi, Tokyo (JP); Takeshi Akao, Tokyo (JP); Hajime Fujita, Tokyo (JP)

(73) Assignee: JAPAN TOBACCO INC., Tokyo (JP)

(*) Notice: Subject to any disclaimer, the term of this patent is extended or adjusted under 35 U.S.C. 154(b) by 1106 days.

(21) Appl. No.: 16/941,603

(22) Filed: Jul. 29, 2020

(65) Prior Publication Data
US 2020/0352254 A1 Nov. 12, 2020

Related U.S. Application Data

(63) Continuation of application No. PCT/JP2018/003551, filed on Feb. 2, 2018.

(51) Int. Cl.
*A24F 40/50* (2020.01)
*A24F 40/51* (2020.01)
(Continued)

(52) U.S. Cl.
CPC ............ *A24F 40/50* (2020.01); *A24F 40/51* (2020.01); *A24F 40/60* (2020.01); *A24F 40/90* (2020.01);
(Continued)

(58) Field of Classification Search
CPC .......... A24F 40/50; A24F 40/90; A24F 40/51; A24F 40/60; A24F 40/10; H02J 7/0042; H02J 7/007
See application file for complete search history.

(56) References Cited

U.S. PATENT DOCUMENTS 8,093,859 B2   1/2012  Aradachi et al.
9,502,917 B2   11/2016 Xiang
(Continued)

FOREIGN PATENT DOCUMENTS

EP   0 750 385 A2   12/1996
EP   2 701 268 A1   2/2014
(Continued)

OTHER PUBLICATIONS

US Office Action issued Aug. 21, 2023, in corresponding U.S. Appl. No. 16/941,620, 31pp.
(Continued)

*Primary Examiner* — Linda L Gray
(74) *Attorney, Agent, or Firm* — XSENSUS LLP

(57) ABSTRACT

An external unit for an inhalation component generation device includes a connection part that is electrically connectable to a power supply of the inhalation component generation device, a sensor that is capable of outputting an output value related to an electrical resistance value of a resistor provided in the power supply, and a first control part that is configured to determine, based on the output value, whether to change a predetermined control with respect to the power supply connected to the connection part or whether to perform the predetermined control.

16 Claims, 11 Drawing Sheets

(51) Int. Cl.
*A24F 40/60* (2020.01)
*A24F 40/90* (2020.01)
*H02J 7/00* (2006.01)
*A24F 40/10* (2020.01)

(52) U.S. Cl.
CPC ............ *H02J 7/0042* (2013.01); *H02J 7/007* (2013.01); *A24F 40/10* (2020.01)

(56) References Cited

U.S. PATENT DOCUMENTS

| | | |
|---|---|---|
| 2004/0160210 A1 | 8/2004 | Bohne et al. |
| 2006/0152191 A1 | 7/2006 | Lee et al. |
| 2008/0238361 A1 | 10/2008 | Pinnell et al. |
| 2010/0308775 A1 | 12/2010 | Mizutani et al. |
| 2014/0270727 A1* | 9/2014 | Ampolini ................ A24F 40/50 392/394 |
| 2015/0027472 A1 | 1/2015 | Amir |
| 2015/0181942 A1 | 7/2015 | Holzherr et al. |
| 2015/0189917 A1 | 7/2015 | Xiang |
| 2015/0357837 A1 | 12/2015 | Takai et al. |
| 2016/0057811 A1* | 2/2016 | Alarcon ................ A24F 40/50 219/494 |
| 2016/0242466 A1 | 8/2016 | Lord et al. |
| 2016/0345627 A1 | 12/2016 | Liu |
| 2017/0229885 A1 | 8/2017 | Bernauer |

FOREIGN PATENT DOCUMENTS

| | | |
|---|---|---|
| EP | 2 899 842 A1 | 7/2015 |
| JP | 08-304518 A | 11/1996 |
| JP | 2012-234722 A | 11/2012 |
| JP | 5151506 B2 | 2/2013 |
| JP | 5193619 B2 | 5/2013 |
| JP | 2014-143901 A | 8/2014 |
| JP | 2015-049935 A | 3/2015 |
| JP | 2015-534458 A | 12/2015 |
| JP | 2016-533712 A | 11/2016 |
| WO | 2007/041866 A1 | 4/2007 |
| WO | 2015/175700 A1 | 11/2015 |
| WO | 2016/119626 A1 | 8/2016 |

OTHER PUBLICATIONS

Communication pursuant to Article 94(3) EPC, issued Dec. 14, 2021, in corresponding European Patent Application No. 18 903 879.7, 5 pages.
Office Action issued on Dec. 5, 2022, in corresponding Chinese patent Application No. 201880088194.1, 31 pages.
Extended European Search Report issued Jan. 19, 2021, in corresponding European Patent Application No. 18903879.7.
Communication pursuant to Article 94(3) EPC issued Sep. 2, 2022, in corresponding European Patent Application No. 18 903 879.7.
International Search Report and Written Opinion mailed on May 1, 2018 for PCT/JP2018/003553 filed on Feb. 2, 2018, 13 pages including English Translation of the International Search Report.
International Search Report and Written Opinion mailed on May 1, 2018 for PCT/JP2018/003551 filed on Feb. 2, 2018, 10 pages including English Translation of the International Search Report.
Russian Office Action with Search Report issued on Feb. 12, 2021, against the corresponding Russian Patent Application No. 2020128834 and an English translation thereof.

* cited by examiner

EXTERNAL UNIT FOR INHALATION COMPONENT GENERATION DEVICE, INHALATION COMPONENT GENERATION SYSTEM, METHOD FOR CONTROLLING EXTERNAL UNIT FOR INHALATION COMPONENT GENERATION DEVICE, AND NON-TRANSITORY COMPUTER READABLE MEDIUM

CROSS REFERENCE TO RELATED APPLICATIONS

This application is a Continuation of PCT International Application No. PCT/JP2018/003551, filed on Feb. 2, 2018, which is hereby expressly incorporated by reference into the present application. This application is related to U.S. Ser. No. 16/941,620, filed on Jul. 29, 2020, entitled: POWER SUPPLY UNIT OF INHALATION COMPONENT GENERATION DEVICE, AND METHOD OF SELECTING ELECTRICAL RESISTANCE VALUE OF KNOWN RESISTOR IN POWER SUPPLY UNIT OF INHALATION COMPONENT GENERATION DEVICE.

TECHNICAL FIELD

The present invention relates to an external unit for an inhalation component generation device, an inhalation component generation system, a method of controlling an external unit for an inhalation component generation device, and a program.

BACKGROUND ART

Instead of a conventional cigarette, there has been proposed an inhalation component generation device (an electronic cigarette or heated tobacco) used for tasting an inhalation component generated by vaporizing or atomizing a flavor source such as tobacco or an aerosol source with a load such as a heater (PTL 1 to PTL 3). Such an inhalation component generation device includes a load that vaporizes or atomizes a flavor source and/or an aerosol source, a power supply that supplies electric power to the load, and a control unit that controls the charge and discharge of the power supply and the load. Since the power supply that supplies the electric power to the load is formed by a secondary battery or the like, the power supply can be charged by a charger.

PTL 1 and PTL 2 each disclose that a charging mode is selected according to a current and a voltage during the charging process. PTL 3 discloses that a charging mode is changed by communication between a battery unit having a power supply and a charger.

PTL 4 to PTL 6 each disclose a technique relating to a change of a charging mode in a technical field different from that of an inhalation component generation device.

CITATION LIST

Patent Literature

PTL 1: U.S. Pat. No. 9,502,917
PTL 2: U.S. Patent No. 2015/0189917
PTL 3: International Publication No. 2015/175700
PTL 4: Japanese Patent No. 5193619
PTL 5: Japanese Patent Laid-Open No. 2014-143901
PTL 6: Japanese Patent No. 5151506

SUMMARY OF INVENTION

A first feature provides an external unit for an inhalation component generation device, the external unit including a connection part that is electrically connectable to a power supply unit of the inhalation component generation device, a sensor that is capable of outputting an output value related to an electrical resistance value of a resistor provided in the power supply unit, and a first control part that is configured to determine, based on the output value, whether to change a predetermined control with respect to the power supply unit connected to the connection part or whether to perform the predetermined control.

The second feature provides the external unit for an inhalation component generation device according to the first feature, wherein the external unit is a charger, and the predetermined control is a control for charging a power supply provided in the power supply unit.

The third feature provides the external unit for an inhalation component generation device according to the second feature, wherein the first control part is configured to change at least one of a current value, a rate, and a charging time period for charging the power supply as the predetermined control, based on the output value.

The fourth feature provides the external unit for an inhalation component generation device according to the second feature or the third feature, wherein the first control part is configured not to charge the power supply or configured to output an abnormal signal when the output value is outside a predetermined range or does not satisfy a predetermined condition, and the first control part is configured to charge the power supply or configured not to output the abnormal signal when the output value is within the predetermined range or satisfies the predetermined condition.

The fifth feature provides the external unit for an inhalation component generation device according to any one of the first feature to the fourth feature, wherein the first control part is configured to be capable of detecting connection of the power supply unit to the connection part, and the first control part is configured to determine whether to change the predetermined control or whether to perform the predetermined control, based on the output value output after the connection of the power supply unit is detected.

The sixth feature provides an inhalation component generation system including the external unit for an inhalation component generation device according to any one of the first feature to the fifth feature, and the power supply unit.

The seventh feature provides the inhalation component generation system according to the sixth feature, wherein an electrical resistance value of the resistor is constant irrespective of a state of the power supply.

The eighth feature provides the inhalation component generation system according to the sixth feature or the seventh feature, wherein the resistor has a known electrical resistance value.

The ninth feature provides the inhalation component generation system according to any one of the sixth feature to the eighth feature, wherein the power supply unit includes a first electrical path that is electrically connected to the external unit through the resistor, a second electrical path that is electrically connected to the external unit while bypassing the resistor, and a switch configured to be capable of opening and closing the second electrical path, and the switch is configured to be closed while the predetermined control is performed.

The tenth feature provides the inhalation component generation system according to any one of the sixth feature to the ninth feature, wherein the power supply unit includes a second control part, the second control part is configured to be capable of controlling between a first mode in which the connection part is electrically disconnected from the power supply or the second control part and a second mode in which the connection part is electrically connected to the power supply or the second control part, and the first control part is configured to determine whether to change the predetermined control or whether to perform the predetermined control, based on the output value acquired during the first mode.

The eleventh feature provides the inhalation component generation system according to the tenth feature, wherein the second control part is configured to transition the power supply unit from the first mode to the second mode after an elapse of a predetermined time period since detection of the connection of the external unit.

The twelfth feature provides the inhalation component generation system according to the eleventh feature, wherein the first control part is configured to determine whether to change the predetermined control or whether to perform the predetermined control, based on the output value the is output before the predetermined time period elapses since detection of the connection of the power supply unit or an electrical resistance value of the resistor that is acquired by the sensor before the predetermined time period elapses since detection of the connection of the power supply unit.

The thirteenth feature provides the inhalation component generation system according to the eleventh feature or the twelfth feature, wherein the predetermined time period is equal to or longer than a time period required from when the first control part detects the connection of the power supply unit until the first control part acquires the electrical resistance value of the resistor.

The fourteenth feature provides the inhalation component generation system according to any one of the eleventh feature to the thirteenth feature further including a notification part, wherein the first control part or the second control part is configured to cause the notification part to function in at least partial time period of the predetermined time period.

The fifteenth feature provides the inhalation component generation system according to any one of the eleventh feature to the fourteenth feature further including a notification part, wherein the first control part or the second control part is configured to cause the notification part to function in manners different after the elapse of the predetermined time period and within the predetermined time period, or cause the notification part to function only one of after the elapse of the predetermined time period and for the predetermined time period.

The sixteenth feature provides the inhalation component generation system according to any one of the tenth feature to the fifteenth feature, wherein a control cycle of the first control part is shorter than the control cycle of the second control part.

The seventeenth feature provides an inhalation component generation system including the external unit for an inhalation component generation device according to any one of the first feature to the fifth feature, and a plurality of the power supply units, wherein the sensor is capable of outputting an output value related to an electrical resistance value of the resistor provided in each of the power supply units, the resistor is connected in parallel with a power supply of the power supply unit with respect to the connection part, the external unit is a charger, the power supply unit includes a switch that is capable of electrically connecting and disconnecting the power supply to/from the external unit and is configured to be closed while the predetermined control is performed, and the electrical resistance value of the resistor in each of the plurality of the power supply units becomes higher as the power supply unit is chargeable at a higher rate.

The eighteenth feature provides a method of controlling an external unit for an inhalation component generation device, the method including the steps of acquiring an output value related to an electrical resistance value of a resistor provided in the power supply unit by the external unit, and determining whether to change a predetermined control with respect to the power supply unit electrically connected to the external unit or whether to perform the predetermined control, based on the output value.

The nineteenth feature provides a program causing an external unit for an inhalation component generation device to execute the method according to the eighteenth feature.

DESCRIPTION OF EMBODIMENTS

Figure 1:
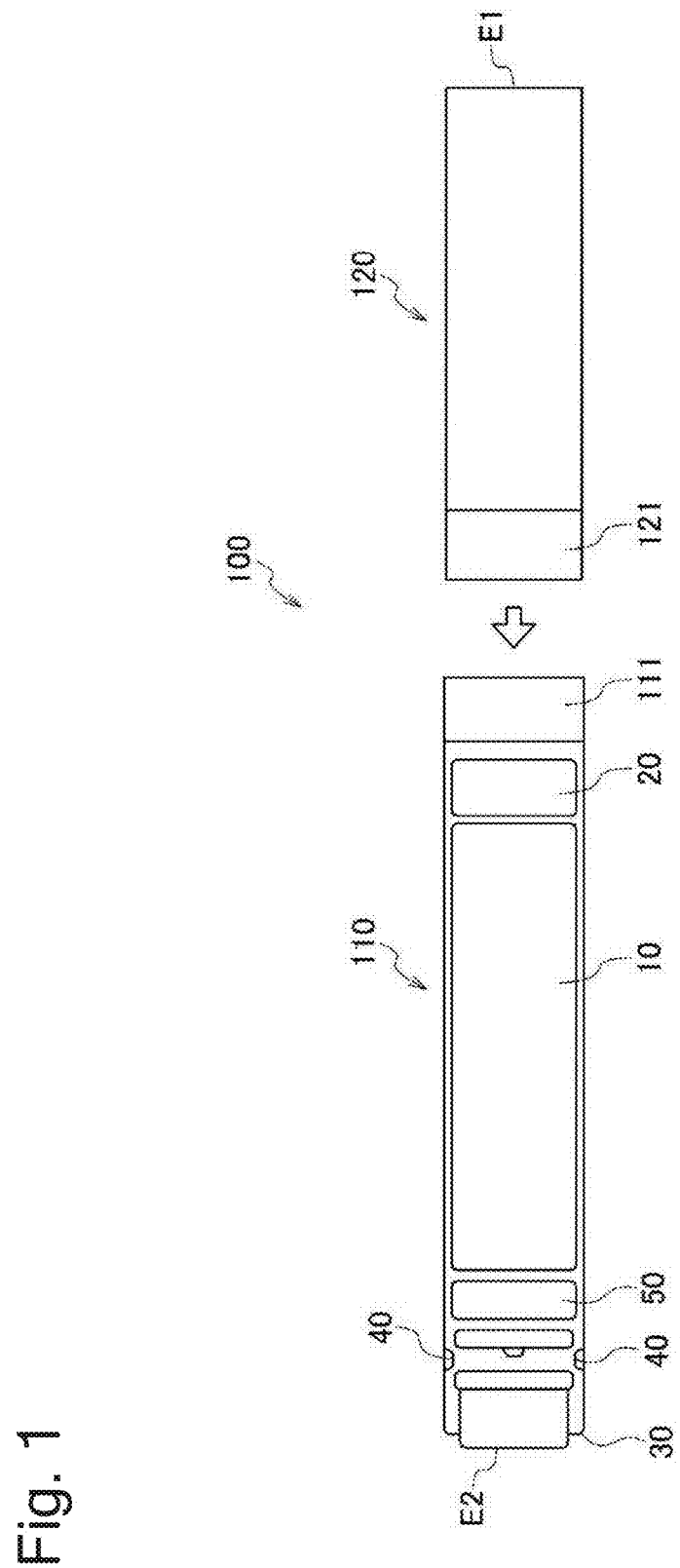
FIG. 1 is a schematic diagram of an inhalation component generation device according to one embodiment.

Hereinafter, embodiments will be described. Note that the same or similar parts are denoted by the same or similar reference signs in the description of the drawings below. However, it should be noted that the drawings are schematic and ratios in dimensions may be different from actual ones.

Therefore, specific dimensions and the like should be determined with reference to the following description. Moreover, it is a matter of course that a part included in drawings mutually may have different dimensional relationships and ratios between the drawings.

[Outline of Disclosure]

The design of a device such as a power supply unit of an inhalation component generation device may be changed from various perspectives. Even when the design is thus changed, the power supply unit after the design change may be configured to be connectable to an external unit that is the same as the external unit to which the power supply unit before the design change is connected, in view of ensuring compatibility and sharing components. In this case, the external unit cannot necessarily perform an optimal control for various types of external units. Alternatively, likewise, the external unit cannot necessarily perform an optimal control for various types of power supply units, when the design of the external unit for an inhalation component generation device is changed from various perspectives.

An external unit for an inhalation component generation device according to one aspect includes a connection part that is electrically connectable to a power supply unit of the inhalation component generation device, a sensor that is capable of outputting an output value related to an electrical resistance value of a resistor provided in the power supply unit, and a first control part that is configured to determine, based on the output value, whether to change a predetermined control with respect to the power supply unit connected to the connection part or whether to perform the predetermined control.

An inhalation component generation system according to one aspect includes the external unit for an inhalation component generation device according to the above-described aspect, and the power supply unit.

A method of controlling a power supply unit of an inhalation component generation system according to one aspect includes the steps of acquiring an output value related to an electrical resistance value of a resistor provided in the power supply unit by the external unit, and determining whether to change a predetermined control with respect to the power supply unit electrically connected to the external unit or whether to perform the predetermined control, based on the output value.

According to the above-described aspect, the external unit can distinguish the type of the power supply unit or the power supply in the power supply unit, using the value related to the electrical resistance value of the resistor in the power supply unit. That is, the external unit can distinguish the type of the power supply unit or the power supply without communicating with the power supply unit, by changing the electrical resistance value of the resistor to be output according to a different type of power supply unit or power supply. Furthermore, the external unit can distinguish the type of the power supply unit or the power supply without being provided with a memory that stores, in the power supply unit, information according to the type of the power supply unit or the power supply. Accordingly, the external unit can perform an optimal control for the power supply unit according to the type of the power supply unit or the power supply.

(Inhalation Component Generation Device)

Figure 2:
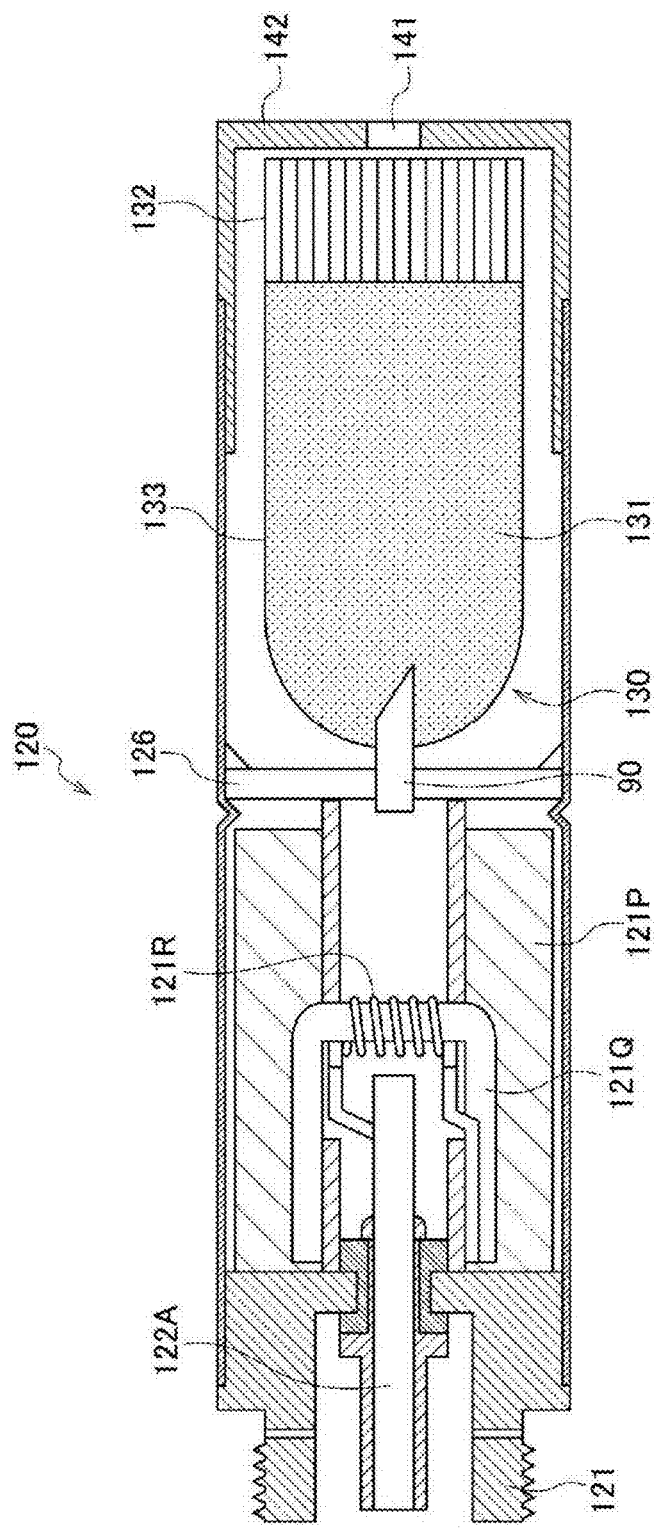
FIG. 2 is a schematic diagram of an atomizing unit according to one embodiment.
Figure 3:
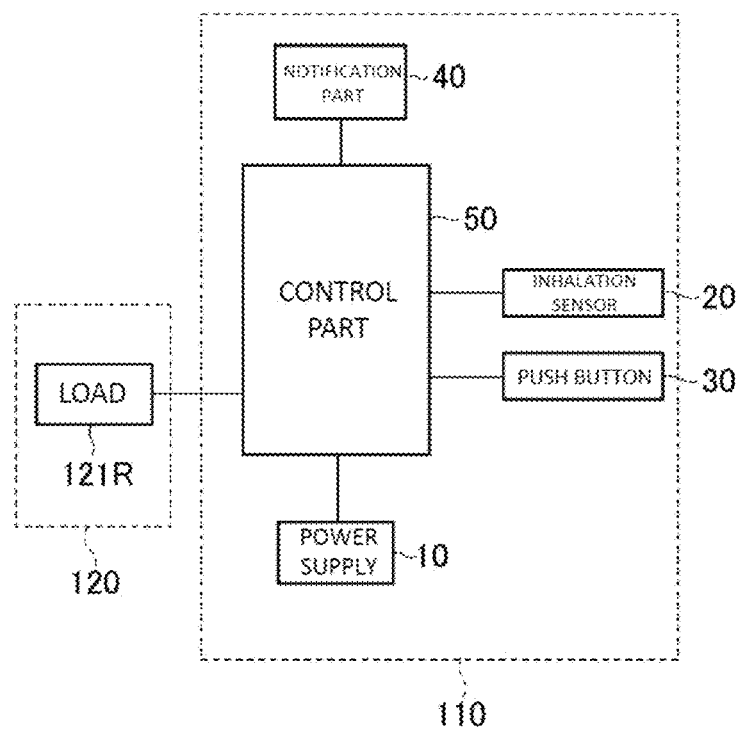
FIG. 3 is a block diagram of the inhalation component generation device.
Figure 4:
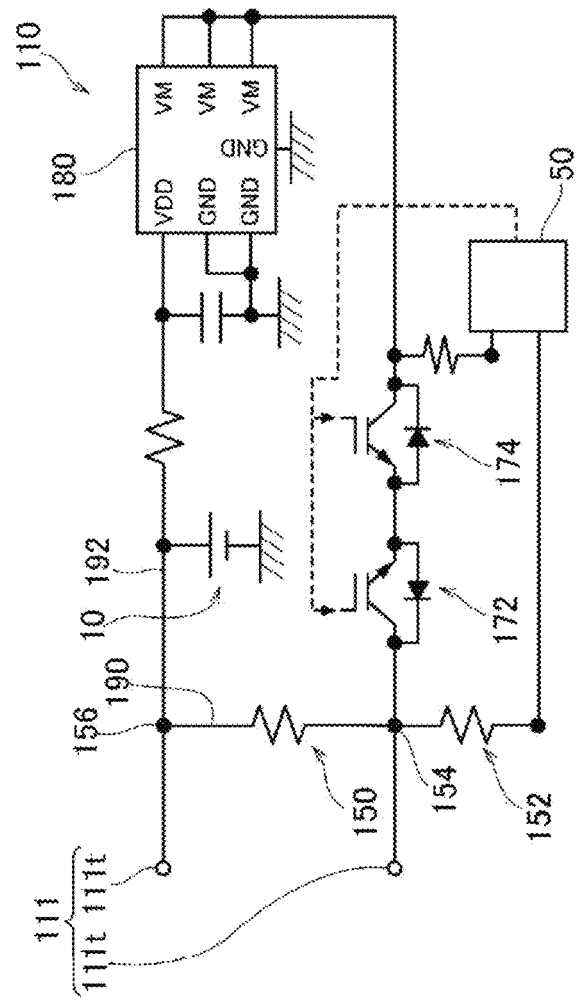
FIG. 4 is a diagram illustrating an electrical circuit of the power supply unit.
Figure 5:
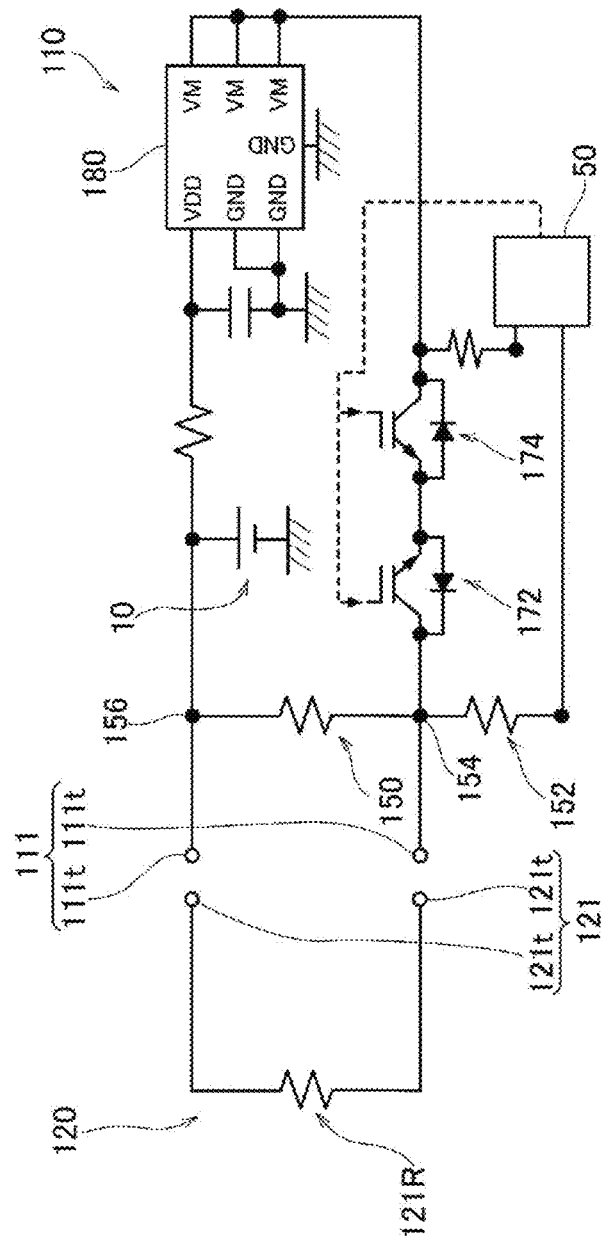
FIG. 5 is a diagram illustrating an electrical circuit of the inhalation component generation device including the power supply unit and the atomizing unit.
Figure 6:
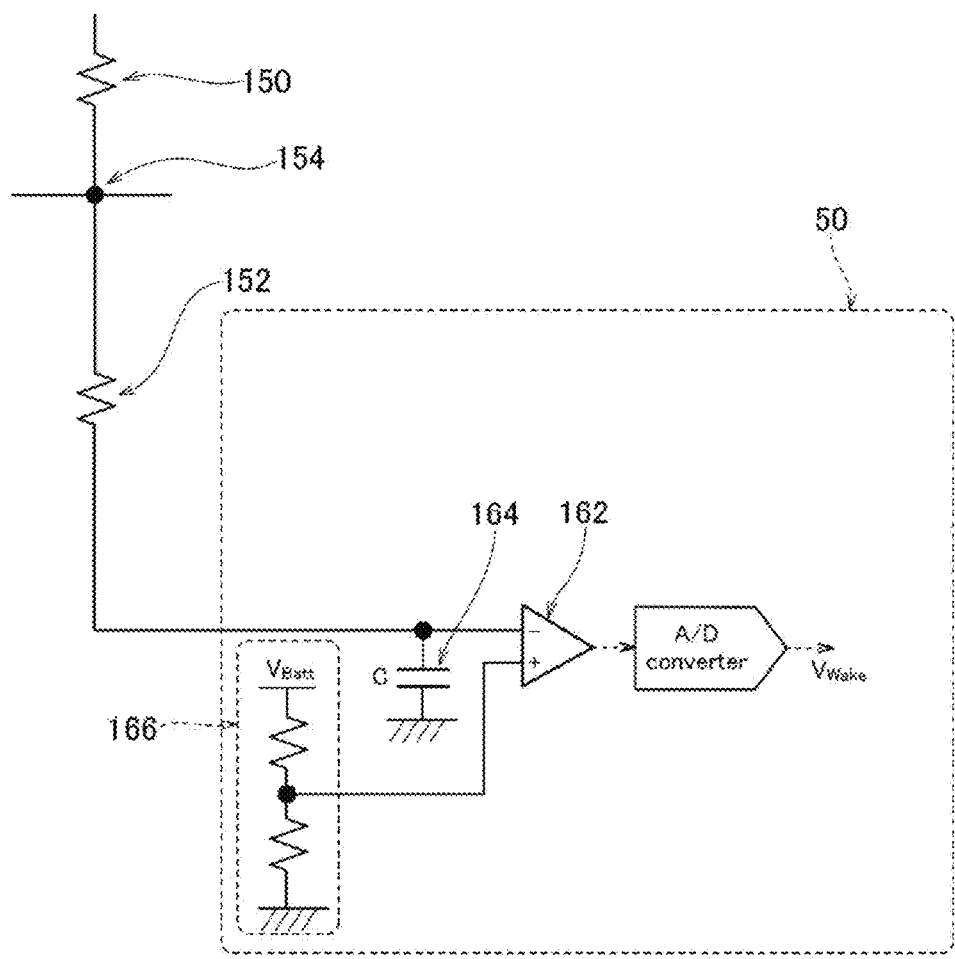
FIG. 6 is a diagram illustrating an example of a configuration of a detecting part that detects a voltage drop amount of a second resistor in the power supply unit.

Hereinafter, an inhalation component generation device according to a first embodiment will be described. FIG. 1 is a schematic diagram of an inhalation component generation device according to one embodiment. FIG. 2 is a schematic diagram of an atomizing unit according to one embodiment. FIG. 3 is a block diagram of the inhalation component generation device. FIG. 4 is a diagram illustrating an electrical circuit of the power supply unit. FIG. 5 is a diagram illustrating an electrical circuit of the inhalation component generation device including the power supply unit and the atomizing unit. FIG. 6 is a diagram illustrating an example of a configuration of a detecting part that detects a voltage drop amount of a second resistor in the power supply unit.

An inhalation component generation device 100 may be a non-combustion-type flavor inhaler for inhaling an inhalation component (an inhaling flavor component) without combustion. The inhalation component generation device 100 may extend along a direction from a non-inhalation port end E2 toward an inhalation port end E1. In this case, the inhalation component generation device 100 may include one end E1 having an inhalation port 141 for inhaling an inhalation component and the other end E2 opposite to the inhalation port 141.

The inhalation component generation device 100 may include a power supply unit 110 and an atomizing unit 120. The atomizing unit 120 may be configured to be detachably attached to the power supply unit 110 through connection parts 111 and 121. When the atomizing unit 120 and the power supply unit 110 are mechanically connected to each other, a load 121R (described later) in the atomizing unit 120 is electrically connected to a power supply 10 provided in the power supply unit 110 through electrical terminals 111$t$ and 121$t$. That is, the electrical terminals 111$t$ and 121$t$ form a connection part capable of electrically connecting and disconnecting the load 121R to/from the power supply 10. Note that as described later, the connection part 111 of the power supply unit 110 may be configured to be connectable to an external unit that is different from the atomizing unit 120.

The atomizing unit 120 includes an inhalation component source to be inhaled by a user, and the load 121R that vaporizes or atomizes the inhalation component source with electric power from the power supply 10. The inhalation component source may include an aerosol source that generates aerosol and/or a flavor source that generates a flavor component.

The load 121R may be any element capable of generating an inhalation component, i.e., aerosol and/or a flavor component from an aerosol source and/or a flavor source by receiving the electric power. The load 121R may be, for example, a heat generating element such as a heater or an element such as an ultrasound generator. Examples of the heat generating element include a heat generation resistor, a ceramic heater, and an induction heating type heater.

Hereinafter, a more detailed example of the atomizing unit 120 will be described with reference to FIG. 1 and FIG. 2. The atomizing unit 120 may include a reservoir 121P, a wick 121Q, and the load 121R. The reservoir 121P may be configured to store a liquid aerosol source or flavor source. The reservoir 121P may be, for example, a porous body made of a material such as a resin web. The wick 121Q may be a liquid holding member that draws the aerosol source or the flavor source from the reservoir 121P using capillary action. The wick 121Q may be made of, for example, glass fiber or porous ceramic.

The load 121R atomizes the aerosol source held by the wick 121Q or heats the flavor source held by the wick 121Q. The load 121R is formed of, for example, a resistive heating element (for example, a heating wire) wound around the wick 121Q.

The air that has flowed in from an inlet hole 122A passes through the vicinity of the load 121R in the atomizing unit 120. The inhalation component generated by the load 121R flows together with the air toward the inhalation port.

The aerosol source may be a liquid at ordinary temperature. For example, polyhydric alcohol such as glycerin and propylene glycol, water or the like may be used as the aerosol source. The aerosol source itself may contain the flavor component. Alternatively, the aerosol source may include a tobacco raw material or an extract deriving from the tobacco raw material that emits an inhaling flavor component by being heated.

Note that, although an example of the liquid aerosol source at ordinary temperature has been described in detail in the above-described embodiment, an aerosol source that is a solid at ordinary temperature may be also used instead of the liquid aerosol source.

The atomizing unit 120 may include a replaceable flavor unit (cartridge) 130. The flavor unit 130 includes a cylindrical body 131 that accommodates the flavor source. The cylindrical body 131 may include a membrane member 133 and a filter 132. The flavor source may be provided in a space formed by the membrane member 133 and the filter 132.

The atomizing unit 120 may include a breaking part 90. The breaking part 90 is a member for breaking a part of the membrane member 133 of the flavor unit 130. The breaking part 90 may be held by a partition wall member 126 for partitioning into the atomizing unit 120 and the flavor unit 130. The partition wall member 126 is made of, for example, a polyacetal resin. The breaking part 90 is, for example, a cylindrical hollow needle. An airflow path that pneumatically communicates between the atomizing unit 120 and the flavor unit 130 is formed by puncturing the membrane member 133 with a tip of the hollow needle. Here, it is preferable that an inside of the hollow needle is provided with a mesh having a roughness of not allowing the flavor source to pass through.

According to an example of the preferred embodiment, the flavor source in the flavor unit 130 imparts the inhaling flavor component to the aerosol generated by the load 121R of the atomizing unit 120. The flavor imparted to the aerosol by the flavor source is sent to the inhalation port 141 of the inhalation component generation device 100. Thus, the inhalation component generation device 100 may have a plurality of inhalation component sources, i.e., the aerosol source and the flavor source. Alternatively, the inhalation component generation device 100 may have only one inhalation component source.

The flavor source in the flavor unit 130 may be a solid at ordinary temperature. By way of example, the flavor source comprises an ingredient piece of a plant material which imparts the inhaling flavor component to the aerosol. Shredded tobacco or a forming body obtained by forming a tobacco material such as a tobacco raw material in a granular form, may be used as an ingredient piece which is a component of the flavor source. Alternatively, the flavor source may comprise a forming body obtained by forming a tobacco material into a sheet form. Also, the ingredient piece, which is a component of the flavor source, may comprise a plant (for example, mint, herb, and the like) other than tobacco. The flavor source may be provided with flavor such as menthol.

The inhalation component generation device 100 may include a mouthpiece 142 having the inhalation port 141 through which a user inhales the inhalation component. The mouthpiece 142 may be configured to be detachably attached to the atomizing unit 120 or the flavor unit 130, or may be configured to be an integral part of the atomizing unit 120 or the flavor unit 130.

The power supply unit 110 may include the power supply 10, a notification part 40, and a control part 50. The power supply 10 stores the electric power necessary for the operation of the inhalation component generation device 100. The power supply 10 may be detachably attached to the power supply unit 110. The power supply 10 may be, for example, a rechargeable secondary battery such as a lithium ion secondary battery.

For example, a microcontroller is used for the control part 50. The control part 50 may configure a control unit by connecting an inhalation sensor 20 and a push button 30. In addition, the inhalation component generation device 100 may include a sensor (not illustrated) that acquires a voltage of the power supply 10 where appropriate. Furthermore, the inhalation component generation device may include a protective IC 180 that protects the power supply 10 from overvoltage and overdischarge where appropriate. The control part 50 performs various types of control necessary for the operation of the inhalation component generation device 100. For example, the control part 50 may constitute a power control part that controls the electric power from the power supply 10 to the load 121R.

When the atomizing unit 120 is connected to the power supply unit 110, the load 121R provided in the atomizing unit 120 is electrically connected to the power supply 10 of the power supply unit 110 (see FIG. 5).

The inhalation component generation device 100 may include a first switch 172 capable of electrically connecting and disconnecting the load 121R to/from the power supply 10. The first switch 172 may be comprised of, for example, a MOSFET.

The first switch 172 is closed in a state in which the atomizing unit 120 is connected to the power supply unit 110, that is, when the first switch 172 is turned on, the electric power is supplied from the power supply 10 to the load 121R. On the other hand, when the first switch 172 is turned off, the supply of the electric power from the power supply 10 to the load 121R is stopped. The turning on and off of the first switch 172 is controlled by the control part 50.

The control part 50 may include a request sensor capable of outputting a signal requesting the operation of the load 121R. The request sensor may be, for example, the push button 30 to be pressed by a user, or the inhalation sensor 20 that detects a user's inhaling operation. The inhalation sensor 20 may be a sensor that outputs a value (for example, a voltage value or a current value) that changes according to the flow rate of air (i.e., a user's puff operation) inhaled from the non-inhalation port side toward the inhalation port side. Examples of such a sensor include a condenser microphone sensor, and a known flow sensor.

The control part 50 acquires an operation request signal to the load 121R from the above-described request sensor and generates a command for operating the load 121R. In a specific example, the control part 50 outputs the command for operating the load 121R to the first switch 172. The first switch 172 is turned on according to this command. Thus, the control part 50 is configured to control the supply of the electric power from the power supply 10 to the load 121R. When the electric power is supplied from the power supply 10 to the load 121R, the inhalation component source is vaporized or atomized by the load 121R. The inhalation component containing the vaporized or atomized inhalation component source is inhaled by the user through the inhalation port 141.

The control part 50 may perform a pulse width modulation (PWM) control with respect to the first switch 172 when acquiring the operation request signal. Note that the control part 50 may perform a pulse frequency modulation (PFM) control, instead of the PWM control. A duty ratio in the PWM control and a switching frequency in the PFM control may be adjusted by various parameters such as a voltage of the power supply 10.

Next, an example of a detailed configuration of the electrical circuit in the power supply unit 110 will be described. In the present embodiment, the power supply unit 110 may include a first resistor 150 and a second resistor 152 that are electrically connected to each other in series. The first resistor 150 is electrically connected to the power supply 10.

It is preferable that the electrical resistance values of the first resistor 150 and the second resistor 152 are known. That is, the first resistor 150 may be a resistor known to the control part 50 and the external unit. More preferably, the electrical resistance value of the first resistor 150 is constant irrespective of the state of the power supply 10. Similarly, the second resistor 152 may be a resistor known to the control part 50 and the external unit. More preferably, the electrical resistance value of the second resistor 152 is constant irrespective of the state of the power supply 10.

The electrical circuit in the power supply unit 110 may include a first electrical path (hereinafter, also referred to as an "authentication circuit") 190 that is electrically connected to the external unit through the first resistor 150, and a second electrical path (hereinafter, also referred to as a "charging circuit") 192 that is electrically connected to the external unit while bypassing the first resistor 150. More specifically, the first resistor 150 is provided in the first electrical path 190 from one of a pair of electrical terminals 111t to the other of the pair of electrical terminals 111t. The second electrical path 192 branches off from the first electrical path 190. The second electrical path 192 extends from one of the pair of electrical terminals 111t to the other of the pair of electrical terminals 111t while bypassing the first resistor 150. That is, the other of the pair of electrical terminals 111t is electrically connected to a first node 154 between the first resistor 150 and the second resistor 152. One of the pair of electrical terminals 111t is electrically connected to a second node 156 that is disposed at a side opposite to the first node 154 with respect to the first resistor 150. The second electrical path 192 may branch off from the first electrical path 190 at the first node 154 and the second node 156. That is, the second electrical path (charging circuit) 192 is electrically connected in parallel with the first electrical path 190 (authentication circuit) with respect to the pair of electrical terminals 111t. In other words, the first electrical path 190 (authentication circuit) and the second electrical path (charging circuit) 192 are electrically connected to each other in parallel by the first node 154 and the second node 156.

The power supply 10 and the control part 50 are provided in the second electrical path 192. In addition, the power supply unit 110 may include the first switch 172 and a second switch 174 that are provided in the second electrical path 192. Each of the first switch 172 and the second switch 174 may be comprised of, for example a MOSFET. The first switch 172 and the second switch 174 are controlled by the control part 50. In addition, the first switch 172 and the second switch 174 may function as so-called discharging FET and charging FET, respectively.

The first switch 172 can transition between an open state and a closed state. The open state refers to a state in which a current output from the power supply 10 is blocked from flowing into the first switch 172 through the first node 154 when the external unit such as a charger 200 is not connected to the connection part 111. The closed state refers to a state in which the current output from the power supply 10 flows into the first switch 172 through the first node 154 when the external unit such as the charger 200 is not connected to the connection part 111. The first switch 172 is electrically connected to the first node 154. Note that the first switch 172 may include a parasitic diode so that the flowing direction of the current output from the power supply 10 that flows into the first switch 172 through the first node 154 is a reverse direction when the external unit such as the charger 200 is not connected to the connection part 111.

In other words, the first switch 172 can transition between the open state in which the current flows from a high potential side to a low potential side of the power supply 10 is blocked and the closed state in which the current flows from the high potential side to the low potential side of the power supply 10. The first switch 172 is electrically connected to the first node 154. Note that the first switch 172 may include a parasitic diode so that the direction from the high potential side to the low potential side of the power supply 10 is the reverse direction.

The second switch 174 may be capable of transitioning between an open state in which a charging current that is input from the connection part 111 and charges the power supply 10 is blocked and a closed state in which the charging current that is input from the connection part 111 and charges the power supply 10 flows. The second switch 174 is electrically connected to the first node 154 through the first switch 172. Note that the second switch 174 may include a parasitic diode so that the flowing direction of the charging current that is input from the connection part 111 and charges the power supply 10 is the reverse direction.

In other words, the second switch 174 may be capable of transitioning between the open state in which the current flowing from a low potential side to a high potential side of the power supply 10 is blocked and the closed state in which the current flows from the low potential side to the high potential side of the power supply 10. The first switch 172 is electrically connected to the first node 154. Note that the second switch 174 may include a parasitic diode so that the direction from the high potential side to the low potential side of the power supply 10 is a forward direction.

The control part 50 may be configured to be capable of detecting a voltage drop amount in the second resistor 152. That is, the control part 50 may include a detecting part that acquires the voltage drop amount in the second resistor 152. An example of this detecting part will be described using FIG. 6. FIG. 6 illustrates the first resistor 150, the second resistor 152, and a part of a configuration of the control part 50.

The detecting part of the control part 50 includes a comparator 162, a capacitor 164, and a reference voltage source 166. The capacitor 164 may be connected to the second resistor 152 and an inverting input terminal of the comparator 162. The reference voltage source 166 may be connected to a non-inverting input terminal of the comparator 162. The reference voltage source 166 may be generated from the power supply 10 using a divider circuit or a linear dropout (LDO) regulator. The comparator 162 converts from an analog voltage value that is a difference between the voltage value input to the inverting input terminal and the voltage value input to the non-inverting input terminal or a value obtained by amplifying the difference, to a digital voltage value $V_{wake}$ based on a predetermined correlation (conversion table), and outputs the digital voltage value $V_{wake}$. The output digital voltage value $V_{wake}$ shows a voltage drop amount in the second resistor 152. Note that the resolution involved in the conversion to digital voltage values is not limited to a particular resolution, and may be, for example, 0.05 V/bit. Note that, although an example is shown in which the detecting part that converts the analog voltage value into the digital voltage value is used to acquire the voltage drop amount in the second resistor 152, instead of this, the detecting part that directly acquires the voltage drop amount in the second resistor 152 as a digital voltage value may be used.

The voltage drop amount in the second resistor 152 differs between the case where nothing is connected to the pair of electrical terminals 111t and the case where the external unit such as the charger 200 or the atomizing unit 120 is connected to the pair of electrical terminals 111t. Accordingly, the control part 50 can detect the connection of the external unit such as the charger 200 or the atomizing unit 120 by acquiring the voltage drop amount in the second resistor 152.

For example, when the control part 50 detects a high-level digital voltage value $V_{wake}$, the control part 50 can estimate that the charger 200 is not connected to the connection part 111. In addition, when the control part 50 detects a low-level digital voltage value $V_{wake}$, the control part 50 can estimate that the charger 200 is connected to the connection part 111.

More specifically, in the state in which the charger 200 is not connected to the connection part 111, the current flows from the power supply 10 to the control part 50 through the first resistor 150 and the second resistor 152. Accordingly, since the voltage drop occurs in the second resistor 152 by the current flowing through the second resistor 152, the control part 50 detects the high-level digital voltage value $V_{wake}$. On the other hand, if a potential of a main negative bus of the charger 200, which is connected to one of the pair of electrical terminals 111t a potential of which is the same as the potential of the first node 154, falls to the ground potential by grounding, the potential of the first node 154 falls to the ground potential by connecting the charger 200 to the connection part 111. Accordingly, since no current flows through the second resistor 152 in the state in which the charger 200 is connected to the connection part 111, the control part 50 detects the low-level digital voltage value $V_{wake}$.

Figure 7:
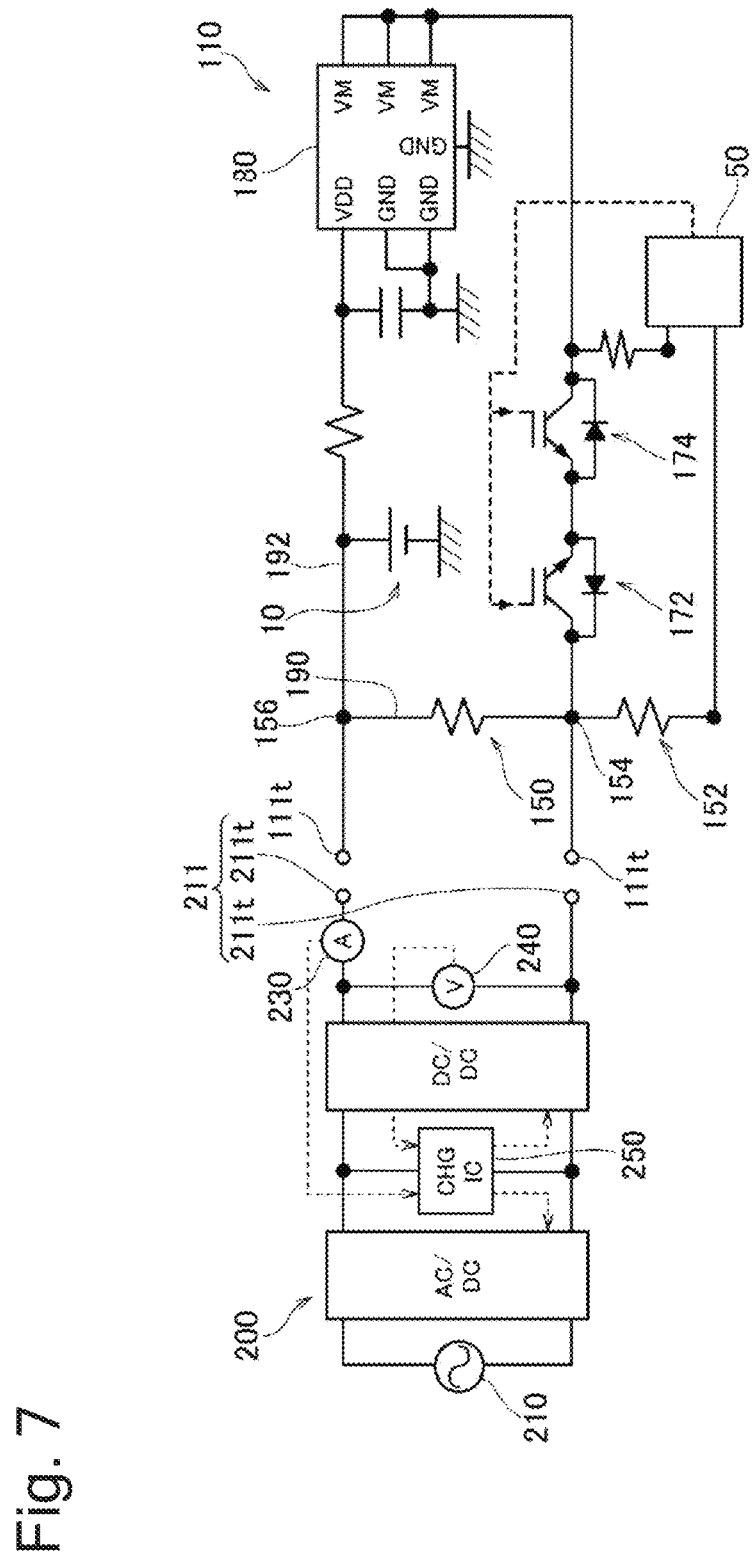
FIG. 7 is a diagram illustrating an electrical circuit of an inhalation component generation system including the power supply unit and a charger 200 for the inhalation component generation device.
Figure 8:
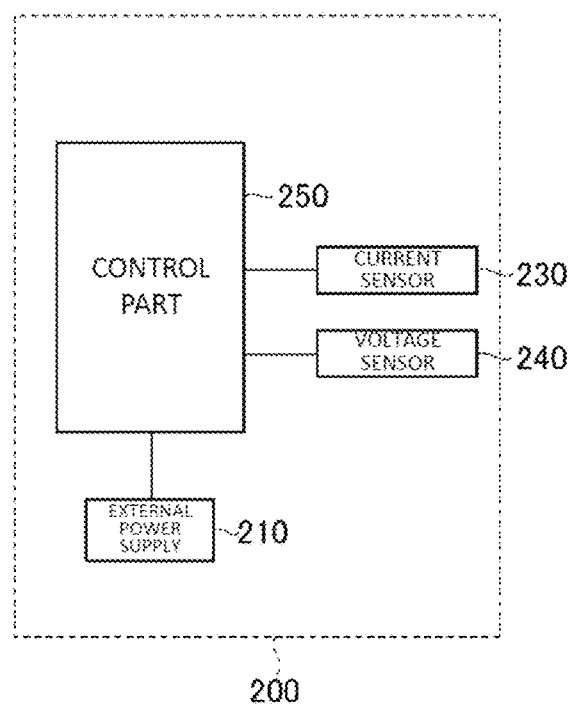
FIG. 8 is a block diagram of the charger.

As described above, the power supply unit 110 of the inhalation component generation device 100 may be configured to be connectable to an external unit that is different from the atomizing unit 120. The external unit may be, for example, the charger 200 that charges the power supply 10 in the power supply unit 110 (see FIG. 7). FIG. 7 is a diagram illustrating an electrical circuit of the charger 200 and the power supply unit 110. FIG. 8 is a block diagram of the charger 200.

The charger 200 may include a connection part 211 that is electrically connectable to the power supply unit 110. The connection part 211 may include a pair of electrical terminals 211t. Here, the pair of electrical terminals 111t of the power supply unit 110 for electrically connecting the load 121R can also serve as the pair of electrical terminals 111t of the power supply unit 110 for electrically connecting the charger 200. That is, the pair of electrical terminals 211t of the charger 200 may be configured to be connectable to the pair of electrical terminals 111t of the power supply unit 110. More preferably, the connection part 111 of the power supply unit 110 is configured to be exclusively connectable to one of the load 121R that vaporizes or atomizes the inhalation component source with electric power from the power supply 10 and the external unit such as the charger 200. In other words, the connection part 111 of the power supply unit 110 is connectable to each of the load 121R and the external unit such as the charger 200, but, when being connected to one of the load 121R and the external unit such as the charger 200, the connection part 111 of the power supply unit 110 is configured to be unable to be connected to the other of the load 121R and the external unit such as the charger 200.

The charger 200 may include an external power supply 210 for charging the power supply 10 in the power supply unit 110. Alternatively, the charger 200 is configured to be electrically connectable and disconnectable to/from the external power supply 210, and may be a device that electrically connects the power supply 10 of the power supply unit 110 to the external power supply 210. The external power supply 210 that is electrically connectable and disconnectable to/from the charger 200 may be a storage battery that outputs a direct current. In addition, the external power supply 210 that is electrically connectable and disconnectable to/from the charger 200 may be an AC commercial power system that is output from a receptacle outlet at home. Note that the charger 200 may have any shape. By way of example, the charger 200 may be shaped similar to a universal serial bus (USB) memory having a USB terminal connectable to a USB port. In addition, by way of example, the charger 200 may be cradle-shaped for holding the power supply unit 110 or case-shaped for accommodating the power supply unit 110 therein. When the charger 200 is formed into a cradle shape or a case shape, it is preferable that the external power supply 210 is incorporated in the charger 200, and has size and weight that can be carried by a user.

The charger 200 may include a control part 250 that controls charging of the power supply 10. Furthermore, the charger 200 may include a current sensor 230 and a voltage sensor 240, where appropriate. The current sensor 230 acquires a charging current to be supplied from the charger 200 to the power supply 10. The voltage sensor 240 acquires a voltage difference between the pair of electrical terminals 211t of the charger 200. The control part 250 of the charger 200 uses an output value from the current sensor 230 and/or the voltage sensor 240 to control the charging of the power supply 10 of the power supply unit 110.

In the case where the external power supply 210 is an alternating current power supply, the charger 200 may include an inverter that converts an alternating current into a direct current. In addition, the charger 200 may further include a voltage sensor that acquires a direct-current voltage output from the inverter, and a converter capable of boosting and/or stepping down the direct-current voltage output by the inverter.

Note that the configuration of the charger 200 is not limited to the above-described configuration, and may be comprised of a divider circuit, LDO, or the like or may include these divider circuit, LDO and the like.

The charger 200 includes a sensor that can output an output value related to an electrical resistance value of the first resistor 150 provided in the power supply unit 110. The output value related to the electrical resistance value may be an electrical resistance value itself, or may be a physical quantity that can be converted into the electrical resistance value. For example, the output value related to the electrical resistance value may be a voltage drop amount (potential difference) in the first resistor 150, or may be a current value of a current flowing through the first resistor 150. Examples of the sensor that can output the output value related to the electrical resistance value of the first resistor 150 include the above-described current sensor 230 or voltage sensor 240.

For example, when the second switch 174 of the power supply unit 110 is open, the voltage sensor 240 can output a value of a voltage applied to the first resistor 150 of the power supply unit 110. In addition, when the second switch 174 of the power supply unit 110 is open, the current sensor 230 can output a value of a current flowing through the first resistor 150 of the power supply unit 110. Each of the value of the voltage applied to the first resistor 150 and the value of the current flowing through the first resistor 150 is an output value related to the electrical resistance value of the first resistor 150.

The charger 200 can distinguish the type of the power supply unit 110 or the power supply 10 in the power supply unit, using the value related to the electrical resistance value of the first resistor 150 in the power supply unit. That is, the charger 200 can distinguish the type of the power supply unit 110 or the power supply 10 without communicating with the power supply unit 110, by changing the electrical resistance value of the first resistor 150 according to a different type of power supply unit 110 or power supply 10.

Thus, the first resistor 150 of the power supply unit 110 can function as a known resistor used for authentication.

The control part 250 of the charger 200 may be configured to be capable of detecting whether the power supply unit 110 is connected to the connection part 211. The connection of the power supply unit 110 to the connection part 211 can be detected by a known method. For example, the control part 250 can detect the connection of the power supply unit 110 by detecting the voltage difference between the pair of connection terminals 211*t*.

To simplify the structure of the inhalation component generation device 100, the control part 250 of the charger 200 may be configured to be incapable of communicating with the control part 50 of the power supply unit 110. In this case, a communication terminal for communicating between the control part 250 of the charger 200 and the control part 50 of the power supply unit 110 is unnecessary. In other words, in the connection interface with the charger 200, the power supply unit 110 has only two electrical terminals, one for a main positive bus and the other for a main negative bus. Simplifying the structure of the inhalation component generation device 100 can improve the weight, cost and production efficiency of the inhalation component generation device 100. Since the inhalation component generation device 100 is configured not to perform communication between the control part 250 of the charger 200 and the control part 50 of the power supply unit 110, the standby power of the transmitter and receiver of each of the control parts 250 and 50 can be reduced, thereby improving the utilization efficiency of the electric power that is stored in the power supply 10 of the power supply unit 110 and the external power supply 210 of the charger 200. Furthermore, since the communication between the control part 250 of the charger 200 and the control part 50 of the power supply unit 110 does not cause the malfunction, the quality of the inhalation component generation device 100 is improved.

(Charge Control by Charger)

Figure 9:
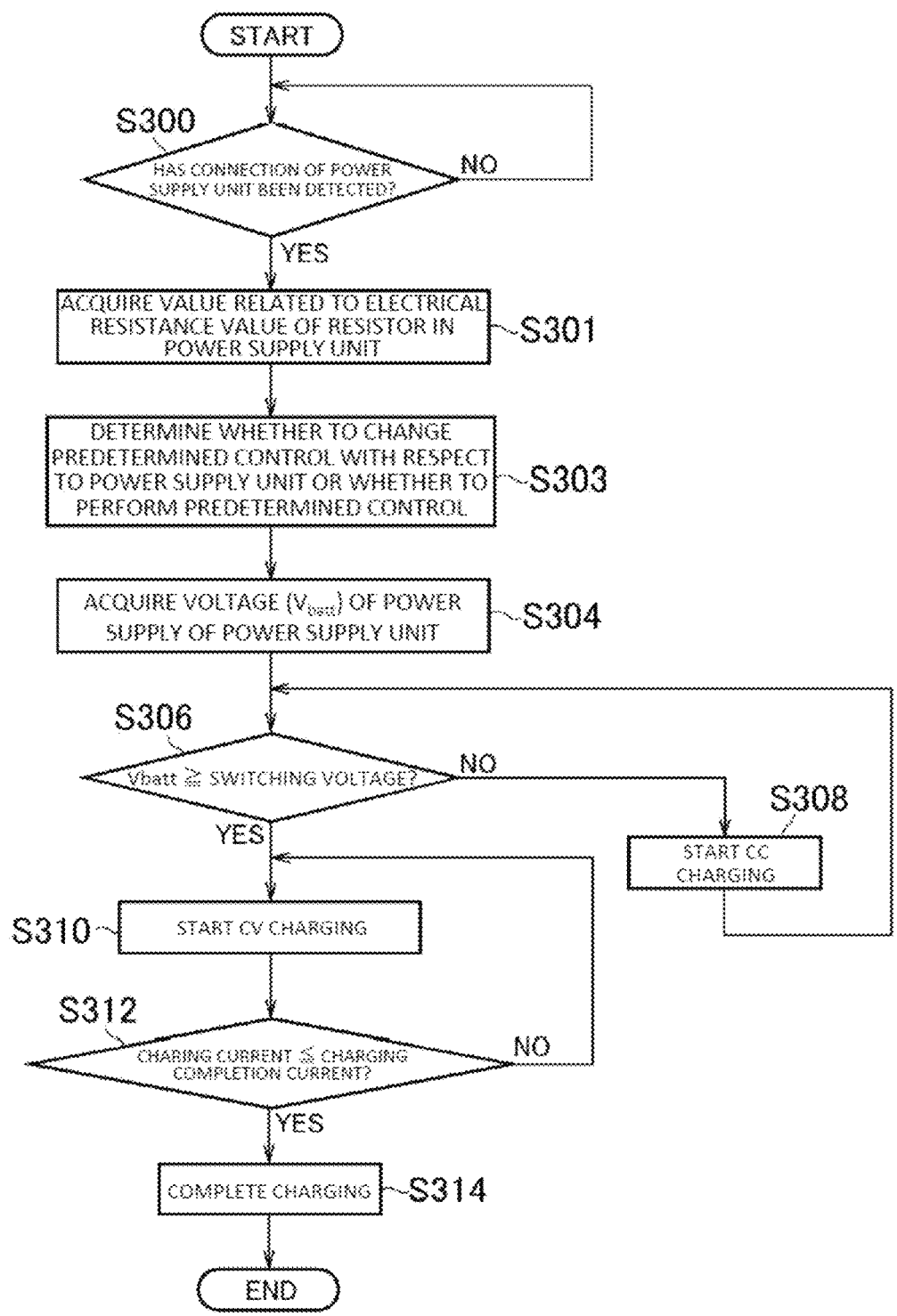
FIG. 9 is a flowchart illustrating an example of a control method by the charger.

FIG. 9 is a flowchart illustrating an example of a control method by the control part 250 of the charger 200. The control part 250, firstly, detects the connection of the power supply unit 110 to the charger 200 (step S300). The control part 250 waits until the power supply unit 110 is connected to the connection part 211 of the charger 200.

When detecting the connection of the power supply unit 110 to the charger 200, the control part 250 acquires a value related to the electrical resistance value of the first resistor 150 in the power supply unit 110 (step S301). The value related to the electrical resistance value of the first resistor 150 may be an electrical resistance value itself of the first resistor 150, may be a voltage drop amount (potential difference) in the first resistor 150, or may be a current value of a current flowing through the first resistor 150.

When the control part 250 acquires the value related to the electrical resistance value of the first resistor 150, it is preferable that the second switch 174 of the power supply unit 110 is open. More specifically, when the control part 250 acquires the value related to the electrical resistance value of the first resistor 150, it is preferable that the power supply unit 110 is in a first mode in which the connection part 111 and the power supply 10 are electrically disconnected from each other. In this state, when a minute current is supplied from the charger 200 to the power supply unit 110, the authentication circuit 190 including the first resistor 150 for authentication functions, whereby the control part 250 can acquire the value related to the electrical resistance value of the first resistor 150.

Note that the control part 250 may acquire the values related to the electrical resistance value of the first resistor 150 a plurality of times and derive, from a moving average, a simple average, a weighted average and the like of these acquired values, the value related to the electrical resistance value of the first resistor 150 that is used in step S303 (described later). Note that the plurality of values related to the electrical resistance value of the first resistor 150 may be acquired from one or more pulses of the minute current.

By the way, a surge current and a surge voltage become dominant in the outputs of the current sensor 230 and the voltage sensor 240 immediately after the minute current is supplied to the power supply unit 110 or at the timing when supply of the minute current to the power supply unit 110 is stopped. Then, the control part 250 may supply the minute current to the power supply unit 110 not in a moment but for a predetermined duration time. It is preferable that the control part 250 acquires the value related to the electrical resistance value of the first resistor 150 without the use of the values output by the current sensor 230 and the voltage sensor 240 immediately after the minute current is supplied to the power supply unit 110 or at the timing when supply of the minute current to the power supply unit 110 is stopped. In other words, it is preferable that the control part 250 acquires the value related to the electrical resistance value of the first resistor 150 using the values output by the current sensor 230 and the voltage sensor 240 at an intermediate time point of the predetermined duration time or at an time point in the vicinity of the intermediate time point.

Note that a time lag may be provided from the time point when the current sensor 230 and the voltage sensor 240 detect the value related to the electrical resistance value of the first resistor 150 until the time point when the control part 250 acquires the value related to the electrical resistance value of the first resistor 150 that is output from the current sensor 230 and the voltage sensor 240, by combining a delay circuit with the current sensor 230 and the voltage sensor 240 for acquiring the value related to the electrical resistance value of the first resistor 150. In the case where the charger 200 is thus configured, it is sufficient for the current sensor 230 and the voltage sensor 240 to detect the value related to the electrical resistance value of the first resistor 150 before the predetermined time period elapses since detection of the connection of the power supply unit 110 in the first mode in step S301. That is, it should be noted that it is not necessary that the control part 250 acquires the value related to the electrical resistance value of the first resistor 150 before the predetermined time period elapses since detection of the connection of the power supply unit 110.

Next, the control part 250 determines whether to change a predetermined control or whether to perform the predetermined control with respect to the power supply unit 110, based on the output value of the sensor, i.e., the value related to the electrical resistance value acquired in step S301 (step S303). As in the present embodiment, when the external unit connected to the power supply unit 110 is the charger 200, the predetermined control may be a control for charging the power supply 10 of the power supply unit 100.

In this case, the first resistor 150 may be used as a known resistor used for authentication. That is, if the electrical resistance value of the first resistor 150 is changed according to the type of the power supply unit 110, the control part 250 can perform an optimal control according to the type of the power supply unit 110.

For example, when the above-described output value is outside a predetermined range or does not satisfy a predetermined condition, the control part 250 does not charge the power supply 10. On the other hand, when the output value is within the predetermined range or satisfies the predetermined condition, the control part 250 may be configured to charge the power supply 10. That is, the change of the predetermined control with respect to the power supply unit 110 in step S301 includes changing such that the charging process is not performed in steps S304 to S314 (described later). Thus, in the case where it is determined that the power supply unit 110 is abnormal or the power supply unit 110 is an inauthentic product, no charging current is supplied, whereby the abnormal situation can be prevented from occurring. Instead of the above-described aspect or in addition to the above-described aspect, the control part 250 may be configured to output an abnormal signal in the case where the above-described output value is outside the predetermined range or does not satisfy the predetermined condition.

Instead of the above-described example, the change of the predetermined control with respect to the power supply unit 110 in step S301 may be at least one of changes of a current value, a rate and a charging time period for charging the power supply. As a specific example, the change of the predetermined control may be a change of the rate of the charging current. That is, the control part 250 can change the rate of the charging current according to the type of the power supply unit 110 or the power supply 10. In this manner, when the power supply 10 enabling rapid charging is used, the control part 50 can perform the charge control with a charging current at a high rate of, for example, 2 C or higher, and when the power supply 10 disabling rapid charging is used, the control part 50 can perform the charge control with a charging current at a low rate of, for example, 1 C or lower. Note that the rate of the charging current is mainly changed in CC charging (described later). To change such a predetermined control, the control part 250 of the charger 200 may include a memory that has stored the values related to the electrical resistance value of the first resistor 150 and the database associating the power supply unit 110 or the power supply 10 with charging conditions such as the rate of the charging current.

It is preferable that the control part 250 of the charger 200 is configured to determine whether to change a predetermined control or whether to perform the predetermined control, based on the output value that is output before a predetermined time period (described later) elapses since detection of the connection of the power supply unit 110, i.e., the value related to the electrical resistance value of the first resistor 150. The predetermined time period corresponds to a time period from when the control part 50 of the power supply unit 110 detects the connection of the charger 200 until the second switch 174 is closed.

Next, the control part 250 performs a predetermined control, i.e., the charge control in the present embodiment. For example, when the power supply 10 of the power supply unit 110 is charged, the control part 250 of the charger 200 firstly estimates a voltage of the power supply 10 using the voltage sensor 240 (step S304).

As will be described later, the second switch 174 may be closed while the predetermined control is performed, i.e., in the step after step S304. If the electrical resistance value of the first resistor 150 is sufficiently higher as compared with an internal resistance (impedance) of the power supply 10, the charging current from the charger 200 flows mainly through the charging circuit 192 including the power supply 10, and scarcely flows in the authentication circuit 190. As such, it is preferable that the second switch 174 is configured to selectively cause one of the charging circuit 192 and the authentication circuit 190 to function. This can prevent loss of electric power in the power supply unit 110 during charging of the power supply 10 as compared with the case where the majority of the charging current from the charger 200 flows through the first resistor 150.

When the voltage of the power supply 10 is equal to or higher than a discharge termination voltage, the control part 250 determines whether the voltage of the power supply 10 is equal to or higher than a switching voltage (step S306). The switching voltage is a threshold for dividing into a section of constant current charging (CC charging) and a section of constant voltage charging (CV charging). The switching voltage may be, for example, in the range of 4.0 V to 4.1 V.

When the voltage of the power supply 10 is less than the switching voltage, the control part 250 charges the power supply 10 by a constant current charging method (step S308). When the voltage of the power supply 10 is equal to or higher than the switching voltage, the control part 250 charges the power supply 10 by a constant voltage charging method (step S310). In the constant voltage charging method, the voltage of the power supply 10 increases as charging proceeds, and the difference between the voltage of the power supply 10 and the charging voltage is reduced, whereby the charging current decreases.

When charging of the power supply 10 is started by the constant voltage charging method, the control part 250 determines whether the charging current is equal to or smaller than a predetermined charging completion current (step S312). Here, the charging current can be acquired by the current sensor 230 in the charger 200. When the charging current is larger than the predetermined charging completion current, charging of the power supply 10 is continued by the constant voltage charging method.

When the charging current is equal to or smaller than the predetermined charging completion current, the control part 250 determines that the power supply 10 is fully charged, and stops the charging (step S314). Note that the condition for stopping the charging include the time period that has elapsed since the start of charging by the constant current charging method or charging by the constant voltage charging method, the voltage of the power supply 10, and the temperature of the power supply 10, in addition to the charging current.

(Control by Control Part of Power Supply Unit in Charging Mode)

Figure 10:
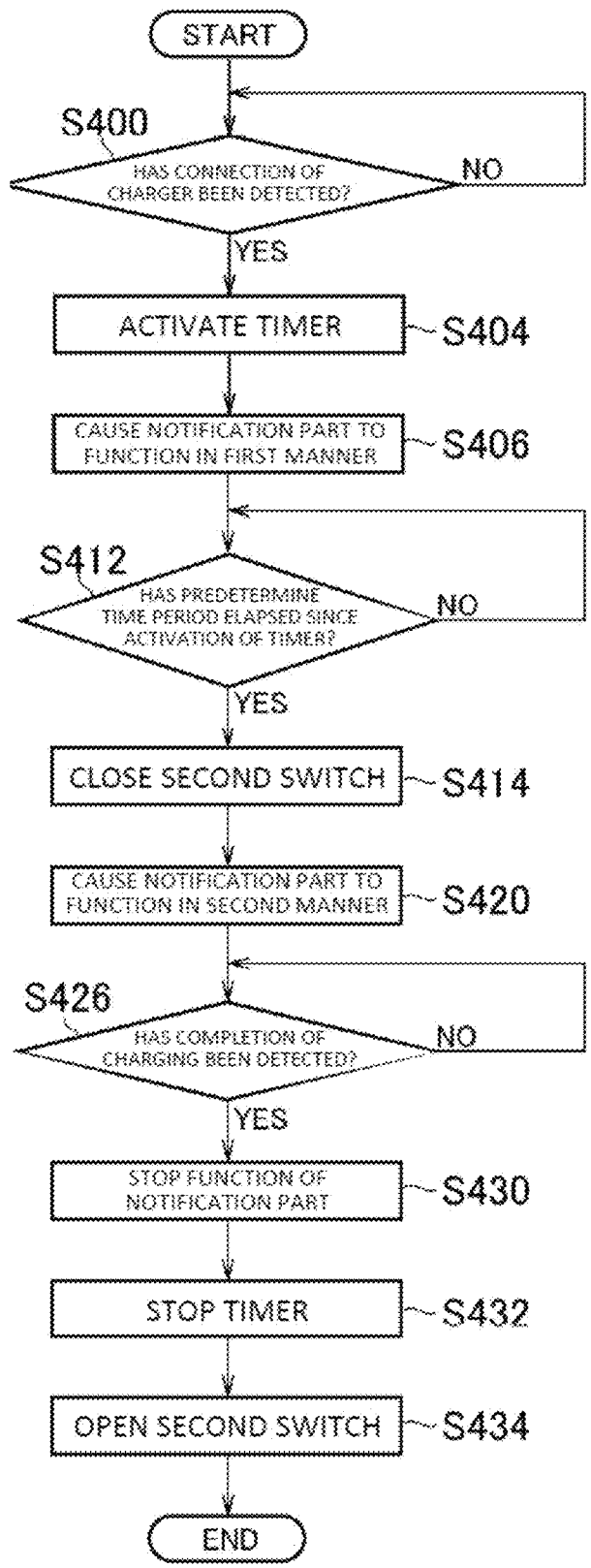
FIG. 10 is a flowchart illustrating an example of a control method of the power supply unit in a charging control.

FIG. 10 is a flowchart illustrating an example of a control method by the control part 50 of the power supply unit 110 in a charging mode. The charging mode is a mode in which the power supply 10 can be charged.

Firstly, the control part 50 detects the connection of the charger 200 to the power supply unit 110 (step S400). The detection of the connection of the charger 200 for example, as described above, can be determined based on a voltage drop amount (Wake signal) in the second resistor 152. Note that the second switch 174 is configured to be maintained in an open state when the charger 200 is not connected to the connection part 111 of the power supply unit 110. In the state in which the second switch 174 is open, the power supply unit 110 is in a standby mode (first mode) in which the connection part 111 and the power supply 10 are electrically disconnected from each other.

When detecting the connection of the power charger 200 to the power supply unit 110, the control part 50 activates a timer (step S404). This timer measures the time period that has elapsed since detection of the connection of the charger 200.

Furthermore, it is preferable that the control part 50 causes the notification part 40 to function in a first manner where appropriate (step S406). For example, in the case where the notification part 40 is a light emitting element such as an LED, the control part 50 causes the notification part to emit light in a predetermined first light emission manner. The control part 50 may be configured to cause the notification part 40 to function in at least partial time period of the above-described predetermined time period. Note that the notification part 40 may be provided in the charger 200, and furthermore the control part 250 of the charger may control the notification part 40 provided in the charger 200. In the case where the control part 250 of the charger controls the notification part 40, the control part 250 of the charger causes the notification part 40 to function in the first manner when the control part 250 of the charger detects the connection of the power supply unit 110.

The control part 50 determines whether the predetermined time period has elapsed since detection of the connection of the charger 200 (step S412). The second switch 174 is maintained in the open state until the predetermined time period elapses since detection of the connection of the charger 200. That is, the standby mode (first mode) in which the connection part 111 and the power supply 10 are electrically disconnected from each other is maintained.

When the predetermined time period elapses since detection of the connection of the charger 200, the control part 50 closes the second switch 174 (step S414). When the second switch 174 is closed, the power supply unit 110 transitions to an operation mode (second mode) in which the connection part 111 and the power supply 10 are electrically connected to each other. When the control part 250 of the charger 200 starts the charging as described above (step S308 and step S310) in the operation mode in which the second switch 174 is closed, charging of the power supply 10 is started.

The detection of the charger 200 by the control part 50 is the condition for transitioning from the first mode in which the authentication circuit 190 functions to the second mode in which the charging circuit 192 functions. However, in the present embodiment, after the elapse of the predetermined time period since the fulfillment of the condition for transitioning from the first mode to the second mode, it transitions from the first mode to the second mode by controlling the second switch 174.

As described above, the control part 50 of the power supply unit 110 maintains the standby mode (first mode) until a predetermined time period elapses since detection of the connection of the charger 200. It is preferable that this predetermined time period is equal to or longer than a time period required from when the control part 250 of the charger 200 detects the connection of the power supply unit 110 until the control part 250 of the charger 200 acquires the value related to the electrical resistance value of the first resistor 150 in the power supply unit 110. This enables the control part 250 of the charger 200 to acquire the value related to the electrical resistance value of the first resistor 150 while the power supply unit 110 is in the standby mode (first mode).

When the control part 50 is in the operation mode (second mode) in which the second switch 174 is closed, it is preferable that the control part 50 causes the notification part 40 to function in a second manner (step S420). For example, in the case where the notification part 40 is a light emitting element such as an LED, the control part 50 causes the notification part 40 to emit light in a predetermined second light emission manner. Note that, as described above, the notification part 40 may be provided in the charger 200, and furthermore the control part 250 of the charger may control the notification part 40 provided in the charger 200. In the case where the control part 250 of the charger controls the notification part 40, the control part 250 of the charger causes the notification part 40 to function in the second manner after the above-described predetermined time period has elapsed since the control part 250 of the charger detected the connection of the power supply unit 110.

It is preferable that the control part 50 and/or the control part 250 cause the notification part 40 to function in different manners after the elapse of the above-described predetermined time period and within the predetermined time period. That is, it is preferable that the first manner of the notification part 40, e.g., the first light emission manner is different from the second manner of the notification part 40, e.g., the second light emission manner. This enables the notification part 40 to notify a user of whether the predetermined time period has elapsed.

Alternatively, the control part 50 and/or the control part 250 may be configured to cause the notification part 40 to function only one of after the elapse of the predetermined time period and for the predetermined time period. That is, the control part 50 and/or the control part 250 may cause the notification part 40 to function at at least one timing of steps S406 and S420. This enables the notification part 40 to notify a user of whether the predetermined time period has elapsed.

The control part 50 determines whether to detect the completion of the charging (step S426). The completion of the charging is detected by detecting, for example, that the connection of the charger 200 is released. Alternatively, the completion of the charging may be detected by detecting, for example, that the charging current from the charger 200 is stopped. When detecting the completion of the charging, the control part 50 stops the function of the notification part 40 and the timer, and opens the second switch 174 (step S430, step S432, and step S434).

The control part 50 of the power supply unit 110 performs the above-described control flow in a predetermined control cycle. On the other hand, the control part 250 of the charger 200 may perform the above-described control flow in a control cycle different from the control cycle of the control part 50. In this case, the control part 250 of the charger 200 can complete the above-described steps S301 and S303 rapidly in the period from when the control part 50 activates the timer until the predetermined time period elapses (step S412).

The control part 50 is configured to control the second switch 174 to thereby transition from the first mode to the second mode when the condition for transitioning from the second mode in which the charging circuit 192 functions to the first mode in which the authentication circuit 190 functions is fulfilled. For example, in the above-described flowchart, when detecting the completion of the charging, the control part 50 controls the second switch 174 to thereby transition from the first mode to the second mode. In this case, it is preferable that the control part 50 controls the second switch so that the time period (corresponding to the above-described predetermined time period) from when the condition for transitioning from the first mode to the second mode is fulfilled until the first mode is transitioned to the second mode is longer than the time period from when the condition for transitioning from the second mode to the first mode is fulfilled until the second mode is transitioned to the first mode.

(Program and Storage Medium)

The aforementioned flow illustrated in FIG. 9 can be performed by the control part 250 of the charger 200. That is, the control part 250 may have a program that causes the charger 200 for the inhalation component generation device to execute the aforementioned flow illustrated in FIG. 9. Furthermore, it should be noted that a storage medium in which the program is stored is also included in the scope of the present invention.

The aforementioned flow illustrated in FIG. 10 can be performed by the control part 50 of the power supply unit 110. That is, the control part 50 may have a program that causes the power supply unit 110 for the inhalation component generation device to execute the aforementioned flow illustrated in FIG. 10. Furthermore, it should be noted that a storage medium in which the program is stored is also included in the scope of the present invention.

(Electrical Resistance Values of First Resistor and Second Resistor)

(1) Relationship with Parasitic Diode of Switch

The present inventors found that electrical resistance values of the first resistor 150 and the second resistor 152 have preferable values from various perspectives. In an example illustrated in FIG. 4, the first switch 172 includes a parasitic diode (also referred to as a body diode) so that the flowing direction of the current output from the power supply 10 that flows into the first switch 172 through the first node 154 is a reverse direction when the external unit such as the charger 200 is not connected to the connection part 111. In other words, the first switch 172 includes a parasitic diode so that the direction from the high potential side to the low potential side of the power supply 10 is the reverse direction. In addition, the second switch 174 includes a parasitic diode so that the flowing direction of the charging current that is input from the connection part 111 and charges the power supply 10 is the reverse direction. In other words, the second switch 174 includes a parasitic diode so that the direction from the high potential side to the low potential side of the power supply 10 is a forward direction. Accordingly, in the case where nothing is connected to the connection part 110 of the power supply unit 110 and the first switch 172 and the second switch 174 are open, the electrical circuit in the power supply unit 110 is appropriately equivalent to a circuit illustrated in FIG. 12. In the equivalent circuit illustrated in FIG. 12, reference numeral 172a denotes a parasitic diode so that the flowing direction of the current output from the power supply 10 that flows into the first switch 172 through the first node 154 is a reverse direction. In other words, reference numeral 172a denotes a parasitic diode so that the direction from the high potential side to the low potential side of the power supply 10 is the reverse direction.

Figure 12:
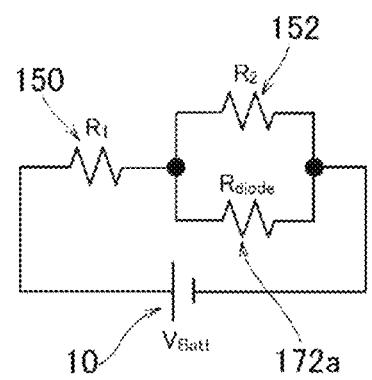
FIG. 12 is a diagram illustrating an equivalent circuit of an electrical circuit in the power supply unit to which the atomizing unit and the external unit are not connected.

In the equivalent circuit illustrated in FIG. 12, the first resistor 150 and the second resistor 152 are connected to each other in series. The parasitic diode 172a is connected in parallel with the second resistor 152. Assuming that the electrical resistance value of the parasitic diode 172a is very high, a voltage value $V_{diode}$ applied to the parasitic diode 172a is represented by the following expression.

$$V_{diode} = V_{Batt} \times R_2/(R_1+R_2) = V_{batt}/(1+R_1/R_2)$$

Where $V_{Batt}$ represents an output voltage of the power supply 10 that can vary from a fully charged voltage to the discharge terminal voltage, $R_1$ represents an electrical resistance value of the first resistor 150, and $R_2$ represents an electrical resistance value of the second resistor 152. It should be noted that in the aforementioned expression, the parasitic diode or the like of the second switch 174 is omitted since it has a value that is sufficiently lower than that of the parasitic diode 172a.

Figure 11:
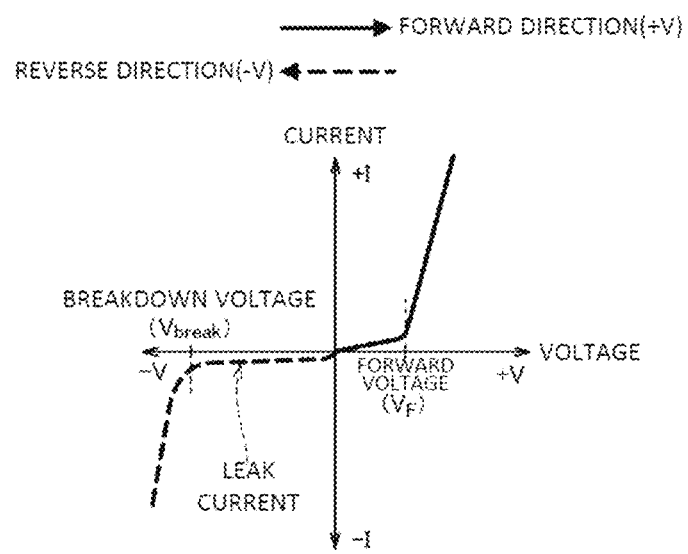
FIG. 11 is a graph showing characteristics of a parasitic diode of a switch.

It is known that the parasitic diode 172a has characteristics illustrated in FIG. 11. FIG. 11 shows a relationship between a voltage applied to the parasitic diode 172a and a current flowing through the parasitic diode 172a. It should be noted that in FIG. 11, a current flowing through the parasitic diode 172a in the forward direction and a voltage applied to cause the current flowing in the forward direction are represented using a plus (+) sign, and a current flowing through the parasitic diode 172a in the reverse direction and a voltage applied to cause the current flowing in the reverse direction are represented using a minus (−) sign. It should be noted that where reference is made to a magnitude of the voltage in the following description, the absolute values are used to compare two voltage values. When a reverse voltage higher than a breakdown voltage $V_{Break}$ is applied to the parasitic diode 172a, that is, when a voltage on the left side of the breakdown voltage $V_{Break}$ in FIG. 11 is applied to the parasitic diode 172a, the current flows through the parasitic diode 172a in the reverse direction, resulting in the loss of the function as the diode. In addition, even when a reverse voltage lower than a breakdown voltage $V_{Break}$ is applied to the parasitic diode 172a, that is, even when a reverse voltage on the right side of the breakdown voltage $V_{Break}$ in FIG. 11 is applied to the parasitic diode 172a, a minute leak current under a quantum effect flows through the parasitic diode 172a in the reverse direction.

When the leak current flows through the parasitic diode 172a of the first switch 172, the leak current flows into the control part 50. Therefore, in some cases, the control part 50 cannot operate normally. Consequently, it is preferable to minimize a value of the current unintentionally leaking from the parasitic diode 172a, that is, the first switch 172 in the open state. As shown in FIG. 11, the leak current has correlation with the voltage applied to the parasitic diode 172a in the reverse direction. Even in the case where the voltage lower than the breakdown voltage $V_{Break}$ is applied, the electrical potential of an electron causing the leak current is increased when the voltage applied in the reverse direction is increased. Consequently, it is preferable to minimize a value $V_{diode}$ of the voltage applied to the parasitic diode 172a, i.e., the first switch 172.

Accordingly, in consideration of the above-described expression, it is preferable that the electrical resistance value $R_2$ of the second resistor 152 is lower than the electrical resistance value $R_1$ of the first resistor 150. Thus, the value of $V_{diode}$ of the voltage applied to the parasitic diode 172a, i.e., the first switch 172 is reduced, whereby the leak current can be reduced.

More preferably, the ratio of the electrical resistance value $R_1$ of the first resistor 150 to the electrical resistance value $R_2$ of the second resistor 152 is designed to apply the voltage lower than the breakdown voltage to the parasitic diode 172a when the external unit is not connected to the connection part 111. This can prevent the function of the parasitic diode 172a from being destroyed.

(2) Consideration of Dark Current

When the external unit is not connected to the connection part 111 of the power supply unit 110, a weak dark current flows through the first resistor 150 and the second resistor 152 from the power supply 10. It is preferable that this dark current is designed to be smaller than a value of current allowing discharging of the power supply 10 when the load 121R of the atomizing unit 120 is connected to the connection part 111. That is, it is preferable that the electrical resistance values $R_1$ and $R_2$ of the first resistor 150 and the second resistor 152 are designed so that a value of the current flowing through the first resistor 150 and the second resistor 152 when the external unit is not connected to the connection part 111 is smaller than a value of the current allowing discharging of the power supply 10 when the load 121R is connected to the connection part 111. This can prevent the power consumption of the power supply unit 110 in the standby state. Note that the current allowing discharging of the power supply 10 when the load 121R is connected to the connection part 111 may be adjusted by the above-described PWM control or PFM control.

This dark current is related to the accuracy of the connection detection of the external unit by the detecting part of the control part 50. That is, as described above, the detecting part of the control part 50 detects the connection of the external unit by distinguishing between the voltage drop amount of the second resistor 152 when the external unit is connected to the connection part 111 and the voltage drop amount of the second resistor 152 when the external unit is not connected to the connection part 111. However, when the electrical resistance values of the first resistor 150 and the second resistor 152 are enormously increased, the dark current becomes enormously minute current value. As will be appreciated, the voltage drop amount of the second resistor 152 depends on the electrical resistance values of the first resistor 150 and the second resistor 152. Accordingly, it is preferable that the first resistor 150 has the electrical resistance value such that the detecting part of the control part 50 can distinguish between the voltage drop amount of the second resistor 152 when the external unit is connected to the connection part 111 and the voltage drop amount of the second resistor 152 when the external unit is not connected to the connection part 111.

To suppress the connection detection errors, it is desirable that the voltage drop amount $V_{wake}$ of the second resistor 152 when the external unit is not connected is maintained at a high level higher than a predetermined threshold $V_{th}$. When the external unit is not connected to the power supply unit 110, the voltage drop amount $V_{wake}$ of the second resistor 152 is represented by "$V_{Wake}=V_{Batt} \times R_2/(R_1+R_2)$."

Here, considering that it is preferable that a relational expression "$V_{wake}>V_{th}$" is established, it is found preferable that the electrical resistance value of the first resistor 150 satisfies the following relational expression: $R_1<(V_{Batt}/V_{th}-1) \times R_2$.

This relational expression can be regarded to specify an upper limit value of the first resistor 150.

In view of the foregoing discussion, specifically, the electrical resistance values of the first resistor 150 and the second resistor 152 may be designed so that a value of the current (dark current) flowing through the first resistor 150 and the second resistor 152 when the external unit is not connected to the connection part 111 is preferably 0.200 mA or less. This can suppress the dark current more efficiently. Note that this can also suppress the connection detection errors efficiently. In addition, the electrical resistance values of the first resistor 150 and the second resistor 152 may be designed so that a rate of the current (dark current) flowing through the first resistor 150 and the second resistor 152 when the external unit is not connected to the connection part 111 is preferably 0.07 mC or less. This can reduce the power consumption associated with the dark current efficiently while enabling the connection detection using the dark current flowing through the second resistor 152. Note that this can also suppress the connection detection errors efficiently.

(3) Consideration of Resolution of Voltage Sensor of External Unit

As described above, the control part 250 of the external unit such as the charger 200 may include the voltage sensor 240 that can acquire the electrical resistance value of the first resistor 150 in the power supply unit 110. In this case, it is desirable that the voltage sensor 240 outputs the electrical resistance value of the first resistor 150 accurately. Accordingly, it is preferable that the voltage drop amount in the first resistor 150 is greater than the resolution of the voltage sensor 240 when the voltage sensor 240 acquires the electrical resistance value of the first resistor 150.

Accordingly, it is preferable that the electrical resistance value $R_1$ of the first resistor 150 is designed so that the voltage drop amount in the first resistor when the external unit discharges to the power supply unit at a predetermined current value is greater than the resolution of the sensor of the external unit that outputs the voltage drop amount in the first resistor 150.

(4) Relationship with Internal Resistance of the Power Supply 10

When the charger 200 is connected to the connection part 111 of the power supply unit 110, the charging current from the charger 200 mainly flows into the power supply 10 from the second node 156 (see FIG. 7). Note that a part of the current flows through the first resistor 150 without flowing into the power supply 10. Since the current flowing through the first resistor 150 becomes a loss, it is preferable that the current flowing through the first resistor 150 is reduced as small as possible. From such viewpoints, it is preferable that the electrical resistance value $R_1$ of the first resistor 150 is higher than the internal resistance value $R_{impedance}$ of the power supply 10.

(5) Relationship with Load of Atomizing Unit

When the load 121R that vaporizes or atomizes the inhalation component source with electric power from the power supply 10 is connected to the connection part 111 of the power supply unit 110, the current discharged from the power supply 10 mainly flows through the second node 156, the load 121R, the first node 154, and the first switch 172 in this order, and then is returned to the power supply 10 (see FIG. 5).

However, a part of the current flows through the first resistor 150 without flowing the load 121R. Since the current flowing through the first resistor 150 becomes a loss, it is preferable that the current flowing through the first resistor 150 is reduced as small as possible. From such viewpoints, it is preferable that the electrical resistance value $R_1$ of the first resistor 150 is higher than the electrical resistance value $R_{load}$ of the load 121R.

(6) Relationship with Time Constant of RC Circuit

As illustrated in FIG. 6, the second resistor 152 and the capacitor 164 are connected to each other in series. That is, the electrical path including the second resistor 152 and the capacitor 164 form a so-called RC circuit.

Here, when the external unit such as the charger 200 is connected to the first node 154 between the first resistor 150 and the second resistor 152, the potential at the first node 154 changes. Since the second resistor 152 and the capacitor 164 form the RC circuit, the voltage output from this RC circuit follows a circuit equation "$V_0 \times \exp(-t/\tau)+V_1$" in the RC circuit. In addition, the voltage output from the RC circuit corresponds to a change in potential at the first node 154, i.e., a change in voltage drop amount in the second resistor 152.

Where, "$V_0$" represents an initial value of the potential difference, i.e., a potential difference at t=0. In the example in which the control part 50 detects the connection of the charger 200, "$V_0$" corresponds to the voltage drop amount (potential difference) in the second resistor 152 when nothing is connected to the power supply unit 110. "$V_1$" represent a final value of the potential difference. When the first node 154 is grounded by the charger 200, $V_1$ is zero.

"t" represents a time period. In the example in which the control part 50 detects the connection of the charger 200, "t" represents the time period that has elapsed from when the charger 200 is physically connected to the power supply unit 110.

Furthermore, $\tau$ is generally called a time constant, and specified by the expression "$\tau=R \times C$." Where "R" represents an electrical resistance value of a resistor in the RC circuit, and "C" represents the capacitance of a capacitor in the RC circuit. In the example illustrated in FIG. 6, "R" is an electrical resistance value of the second resistor 152, and "C" is the capacitance of the capacitor 164.

When the control part 50 detects the connection of the external unit to the connection part 111, the control part 50 needs to detect the voltage drop amount in the second resistor 152 after the voltage drop amount in the second resistor 152 sufficiently approaches the final value. From such viewpoints, it is preferable that the time constant $\tau$ is small. That is, it is preferable that the electrical resistance value of the second resistor 152 is low.

More specifically, it is preferable that the electrical resistance value of the second resistor 152 is designed such that the time constant $\tau$ of the RC circuit formed by the second resistor 152 and the capacitor 164 is shorter than a cycle in which the detecting part of the control part 50 detects the voltage drop amount in the second resistor 152. In this way, the voltage drop amount in the second resistor 152 varies to a value sufficiently close to the final value in a time period shorter than the detection cycle of the detecting part of the control part 50. Accordingly, the control part 50 can detect the connection of the external unit to the connection part 111 of the power supply unit 110 rapidly and more accurately.

Note that the voltage drop amount in the second resistor 152 is detected by the detecting part of the control part 50 in a single sequence consecutively a plurality of times, and the control part 50 may use an average value of these detected voltage drop amounts as the voltage drop amount in the second resistor 152. In this case, it is preferable that the electrical resistance value of the second resistor 152 is designed such that the time constant $\tau$ of the RC circuit formed by the second resistor 152 and the capacitor 164 is shorter than a cycle in which this sequence is performed.

In particular, as described above, in the case where the control part 50 of the power supply unit 110 cannot communicate with the control part 250 of the external unit such as the charger 200, it is difficult to synchronize the control parts 50 and 250. In this case, it is preferable that the control part 50 rapidly detects the connection of the external unit not to cause the deviation between the control by the control part 50 of the power supply unit 110 and the control by the control part 250 of the external unit such as the charger 200.

(Inhalation Component Generation System Having a Plurality of Power Supply Units)

The present invention can be also applied to an inhalation component generation system including an external unit for an inhalation component generation device, and a plurality of power supply units that are electrically connectable to a connection part of the external unit. It is preferable that the external unit is the charger 200. The configurations of the charger 200 and each of the power supply units 110 are as described above. Accordingly, the detailed description of configurations of the charger 200 and each of the power supply units 110 is omitted. However, the electrical resistance values of the first resistors 150 in the power supply units 110 may be different from one another.

It is preferable that the electrical resistance value of the first resistor 150 in each of the plurality of the power supply units 110 becomes higher as the power supply unit 110 has the power supply 10 that is chargeable at a higher rate. That is, the electrical resistance value of the first resistor 150 provided in each of the plurality of power supply units 110 is selected to a higher value as the power supply unit 110 has the power supply 10 that is chargeable at a higher rate.

When the charging current is supplied at a high rate in the case where the charging current is supplied from the charger 200 to the power supply 10 of the power supply unit 110, a relatively large current flows easily in the authentication circuit 190 including the first resistor 150. That is, as the charging current flows at a higher rate, the amount of unnecessary current that does not contribute to the charging of the power supply 10 is increased, which causes an increase in loss of electric power.

Accordingly, the electrical resistance value of the first resistor 150 in the power supply unit 110 is selected to a higher value as the power supply unit 110 has the power supply 10 that is chargeable at a higher rate. Therefore, the amount of unnecessary current that does not contribute to the charging of the power supply 10 can be suppressed even in the power supply unit 110 having the power supply 10 that is chargeable at a higher rate.

[Other Embodiments]

Although the present invention has been described by the embodiments described above, it should not be understood that the descriptions and the drawings that form a part of this disclosure limit the present invention. Various alternative embodiments, examples and operation techniques will be apparent to those skilled in the art from this disclosure.

For example, in the above-described embodiment, the external unit that is connected to the power supply unit 110 for the inhalation component generation device is mainly the charger 200. However, the external unit is not limited to the charger 200. The external unit may be any unit that can output the value related to the electrical resistance value of the resistor in the power supply unit and performs a predetermined control with respect to the power supply unit. Even in such a case, the external unit can distinguish the type of the power supply unit or the power supply in the power supply unit, and can perform an optimal control for the power supply unit according to the type of the power supply unit or the power supply.

What is claimed is:

1. An external unit for an inhalation component generation device, the external unit comprising:
   an interface including two terminals that are configured to be electrically connectable to a power supply of the inhalation component generation device;

a sensor configured to acquire a value of a voltage difference between the two terminals or of a current flowing into and from the two terminals, the value related to an electrical resistance value of a resistor provided in the power supply, and to output the value as an output value; and circuitry configured to determine, based on the output value, whether to change a predetermined control with respect to the power supply connected to the interface or whether to perform the predetermined control, wherein the predetermined control is a control for charging a secondary battery provided in the power supply and changing the predetermined control includes changing a rate for charging the secondary battery through the two terminals to be a rate determined according to a type of the power supply, the type determined according to the output value.

2. The external unit for an inhalation component generation device according to claim 1, wherein
the external unit is a charger.

3. The external unit for an inhalation component generation device according to claim 2, wherein
the circuitry is configured:
not to charge the power supply when the output value is outside a predetermined range or does not satisfy a predetermined condition; or
to output an abnormal signal when the output value is outside the predetermined range or does not satisfy the predetermined condition, and the circuitry is configured:
to charge the power supply when the output value is within the predetermined range or does not satisfy the predetermined condition; or
not to output the abnormal signal when the output value is within the predetermined range or satisfies the predetermined condition.

4. The external unit for an inhalation component generation device according to claim 1, herein the circuitry is configured to:
detect connection of the power supply to the interface; and
determine whether to change the predetermined control or whether to perform the predetermined control, based on the output value output after the connection of the power supply is detected.

5. An inhalation component generation system, comprising:
a power supply of an inhalation component generating device; and
a charger comprising
an interface including two terminals that are configured to be electrically connectable to the power supply;
a sensor configured to acquire a value of a voltage difference between the two terminals or of a current flowing into and from the two terminals, the value related to an electrical resistance value of a resistor provided in the power supply, and to output the value as an output value; and
first control circuitry configured to determine, based on the output value, whether to change a predetermined control with respect to the power supply connected to the interface or whether to perform the predetermined control, wherein the predetermined control is a control for charging a secondary battery provided in the power supply and changing the predetermined control includes changing a rate for charging the secondary battery through the two terminals to be a rate determined according to a type of the power supply, the type determined according to the output value.

6. The inhalation component generation system according to claim 5, wherein
an electrical resistance value of the resistor is constant irrespective of a state of the power supply.

7. The inhalation component generation system according to claim 5, wherein
the resistor has a known electrical resistance value.

8. The inhalation component generation system according to claim 5, wherein the power supply includes:
the power supply includes second control circuitry configured to perform control between a first mode in which the interface is electrically disconnected from the power supply or the second control circuitry and a second mode in which the interface is electrically connected to the power supply or the second control circuitry; and
the first control circuitry is configured to determine whether to change the predetermined control or whether to perform the predetermined control, based on the output value acquired during the first mode.

9. The inhalation component generation system according to claim 5, wherein
the power supply includes second control circuitry configured to perform control between a first mode in which the interface is electrically disconnected from the power supply or the second control circuitry and a second mode in which the interface is electrically connected to the power supply or the second control circuitry; and
the first control circuitry is configured to determine whether to change the predetermined control or whether to perform the predetermined control, based on the output value acquired during the first mode.

10. The inhalation component generation system according to claim 9, wherein
the second control circuitry is configured to transition the power supply from the first mode to the second mode after an elapse of a predetermined time period since detection of the connection of the charger.

11. The inhalation component generation system according to claim 10, wherein
the first control circuitry is configured to determine whether to change the predetermined control or whether to perform the predetermined control, based on the output value is output before the predetermined time period elapses since detection of the connection of the power supply or an electrical resistance value of the resistor that is acquired by the sensor before the predetermined time period elapses since detection of the connection of the power supply.

12. The inhalation component generation system according to claim 10, wherein
the predetermined time period is equal to or longer than a time period required from when the first control circuitry detects the connection of the power supply until the first control circuitry acquires the electrical resistance value of the resistor.

13. The inhalation component generation system according to claim 10, further comprising:
a user interface, wherein
the first control circuitry or the second control circuitry is configured to cause the user interface to function in at least partial time period of the predetermined time period.

14. The inhalation component generation system according to claim 10, further comprising:
a user interface, wherein
the first control circuitry or the second control circuitry is configured to cause the user interface to function in manners different after the elapse of the predetermined time period and within the predetermined time period, or cause the user interface to function only one of after the elapse of the predetermined time period and for the predetermined time period.

15. The inhalation component generation system according to claim 9, wherein
a control cycle of the first control circuitry is shorter than a control cycle of the second control circuitry.

16. An inhalation component generation system, comprising:
a plurality of power supplies; and
a charger comprising
an interface including two terminals configured to be electrically connectable to the power supply;
a sensor configured to acquire a value of a voltage difference between the two terminals or of a current flowing into and from the two terminals, the value related to an electrical resistance value of a resistor provided in each of the plurality of power supplies, and to output the value as an output value; and
first control circuitry configured to determine, based on the output value, whether to change a predetermined control with respect to the power supply connected to the interface or whether to perform the predetermined control, wherein
the predetermined control is a control for charging a secondary battery provided in the power supply and changing the predetermined control includes changing a rate for charging the secondary battery through the two terminals to be a rate determined according to a type of the power supply, the type determined according to the output value,
the sensor is configured to output an output value related to an electrical resistance value of the resistor provided in each of the power supplies,
the resistor of each of the plurality of power supplies is connected in parallel with respect to the interface,
each of the plurality of power supplies include a switch configured to electrically connect and disconnect the power supply to/from the charger and is configured to be closed while the predetermined control is performed, and
the electrical resistance value of the resistor in each of the plurality of the power supplies becomes higher as the power supply is chargeable at a higher rate.

* * * * *